United States Patent

[11] 3,593,152

[72] Inventor Masatsugu Aoki
Tokyo, Japan
[21] Appl. No. 788,444
[22] Filed Jan. 2, 1969
[45] Patented July 13, 1971
[73] Assignee Alps Electric Company, Limited
Tokyo, Japan
[32] Priority Feb. 16, 1968
[33] Japan
[31] 43/11070

[54] PUSHBUTTON TUNER AND INDICATING DEVICE THEREFOR
20 Claims, 7 Drawing Figs.

[52] U.S. Cl. 325/352, 325/455, 325/468, 116/116, 334/7, 334/86
[51] Int. Cl. H04b 1/08
[50] Field of Search 325/352, 455, 468, 477; 116/116, 124.1, 124.4; 334/7.15, 86

[56] References Cited

UNITED STATES PATENTS

| | | | |
|---|---|---|---|
| 2,260,088 | 10/1941 | Polydoroff | 325/455 |
| 2,526,992 | 10/1950 | Biermann et al. | 116/124.1 |
| 2,910,036 | 10/1959 | Lasko | 116/116 |
| 3,029,339 | 4/1962 | Pan | 325/468 |
| 3,465,708 | 9/1969 | Linz et al. | 325/455 |
| 3,508,176 | 4/1970 | Labude et al. | 325/455 |

*Primary Examiner*—Robert L. Griffin
*Assistant Examiner*—James A. Brodsky
*Attorney*—James and Franklin

ABSTRACT: A communication receiver having selectively actuable frequency selectors comprises a plurality of indicators each of which is operatively connected to a corresponding one of the selectors. The actuation of one of the selectors tunes the receiver to a predetermined frequency and renders operative its associated indicator to provide an indication of the frequency to which the receiver is tuned.

INVENTOR
MATSATSUGU AOKI
BY James and Franklin
ATTORNEY

INVENTOR
MATSATSUGU AOKI
BY James and Franklin
ATTORNEY

INVENTOR
MATSATSUGU AOKI
BY James and Franklin
ATTORNEY

PUSHBUTTON TUNER AND INDICATING DEVICE THEREFOR

The present invention relates to communications receivers, and particularly to an AM, FM or TV receiver or the like, which can be tuned to one of a number of preselected stations by the operation of one of a corresponding plurality of selectors.

In recent years, the provision of pushbutton station selection in home communications receivers has become widespread. In these receivers a plurality of stations or channels are preselected by the listener, and the choice of one of these stations is made by actuating the appropriate one of a plurality of pushbuttons, each of which is associated with a different preselected station. Such actuation is effective to modify the tuning element in the receiver tuning circuit in a number of known ways, as by inserting selected inductance slugs into the tuning circuit, by varying a common tuning element such as a variable capacitor, or by the selective connection of a voltage-variable capacitance diode to one of a plurality of different voltage sources, the capacitance value of that diode being determined by the value of the reverse bias signal applied thereto from that voltage source.

In most pushbutton tuned receivers, the selected station associated with the actuation of a given pushbutton may be varied, when desired, so that the listener may modify his listening options when he tires of one or more of the preselected stations by readjusting the pushbutton or some other element in the tuner so that a new station will from that time on be selected by the actuation of that pushbutton. For this reason, it is desirable that an indication of the station which will be selected by the actuation of any one of the pushbuttons be provided. That indication should be clearly visible and should provide accurate and unambiguous identification of the station which that pushbutton is adjusted to select. This will not only permit positive selection of a desired preset station, but will also enable the user to accurately reset the pushbutton to select a new station.

The prior art pushbutton tuners provide effective pushbutton selection of one of a plurality of preselected stations, but the listener often has great difficulty in determining to which station the receiver is tuned at a given time, and even more difficulty in accurately readjusting the pushbutton to select a given station, especially when that pushbutton and the receiving set are not both operative.

It is a prime object of the present invention to provide an improved tuning selector and indicator in which the station associated with a given pushbutton is clearly indicated to the listener whether or not that pushbutton is actuated or the receiving set is energized.

It is a further object of the present invention to provide a pushbutton station selector for a communications receiver, in which a clear, unambiguous indication is provided as to which pushbutton is actuated at a given time.

It is another object of the present invention to provide an indicator for use in a communications receiver having provision for automatic tuning to one of a plurality of preselected stations, in which the listener is clearly and unambiguously apprised of the station to which the receiver is tuned at a given time, and in which retuning of the receiver is accurately and easily effected to modify one or more of the preselected stations.

It is an additional object of the present invention to provide a pushbutton tuner for use in a communications receiver in which an indicating lamp is operatively associated with each of the pushbuttons to provide intensification of the visibility of the tuning indicator associated with each pushbutton when the latter is actuated.

To these ends, the present invention provides, in a communications receiver having a tuning circuit, means for selecting one of a plurality of preselected frequencies and for indicating which frequency has been so selected. Each of a plurality of individually actuatable frequency or station selectors is effective when actuated to vary the tuning circuit in a predetermined manner so as to tune the receiver to one of its predetermined frequencies. A plurality of indicators are respectively operatively connected to each of the frequency selectors and are effective to provide an indication of the frequency to which the receiver will be tuned by the selective actuation of that selector. An illuminator is effective to intensify that indicator associated with that selector which is operative at a given time.

The receiver may comprise a plurality of tuning elements which are preset at different values, each selector being effective when actuated to operatively connect one of these tuning elements into the tuning circuit, thereby to tune the receiver at the desired frequency.

An articulatable control member is operatively connected to each of the indicators and to each of the tuning elements associated with that indicator and is effective, when manually articulated, to simultaneously vary both the indicator and the tuning element. In this manner, one or more of the preselected frequencies of the receiver may be varied and a clear indication of this variation is provided.

The selectors may be in the form of slidable pushbuttons, the control members being in the form of sleeves rotatable arranged about those portions of the pushbuttons extending outwardly from the receiver. The indicator may comprise a rotatable cylinder having an axially extending, contrasting spiral formed thereon, the receiver housing having a plurality of slots respectively disposed in axial relation to the cylinders so that a segment of the spiral on each of the indicating cylinders is visible through each slot. The operation of the control member to vary the value of the tuning element so as to vary one of the preselected stations, causes the cylinder to rotate. The rotation of the cylinder produces relative axial movement of the visible segment of the spiral as viewed through the slot, thereby providing a visual indication of the new station to which the receiver is tuned by the operation of the control member.

To the accomplishment of the above, and to such other objects as may hereinafter appear, the present invention relates to a tuning indicator and station selector for a communications receiver as defined in the accompanying claims and as described in this specification, taken together with the accompanying drawings in which:

The present invention relates to a frequency selector and indicator for use in a communications receiver such as an AM, FM or TV receiver, which can be selectively tuned to one of a plurality of predetermined frequencies by the selective actuation of one of a corresponding plurality of selectors generally designated A. Indicators generally designated B are provided in association with each selector to apprise the listener of the frequency or station to which the receiver is tuned. One of a plurality of illuminating means generally designated C is selectively energized by the actuation of a corresponding selector A to increase the visibility of the indicator B associated with that selector A. In this manner, a clear indication is given of the station to which the receiver is tuned by the actuation of one of the selectors A. An articulatable control member generally designated D is provided at each of the selectors A and is effective when articulated to vary the station selected by its corresponding selector A and to vary the indication of its corresponding indicator B.

Figures 1, 2, 7:
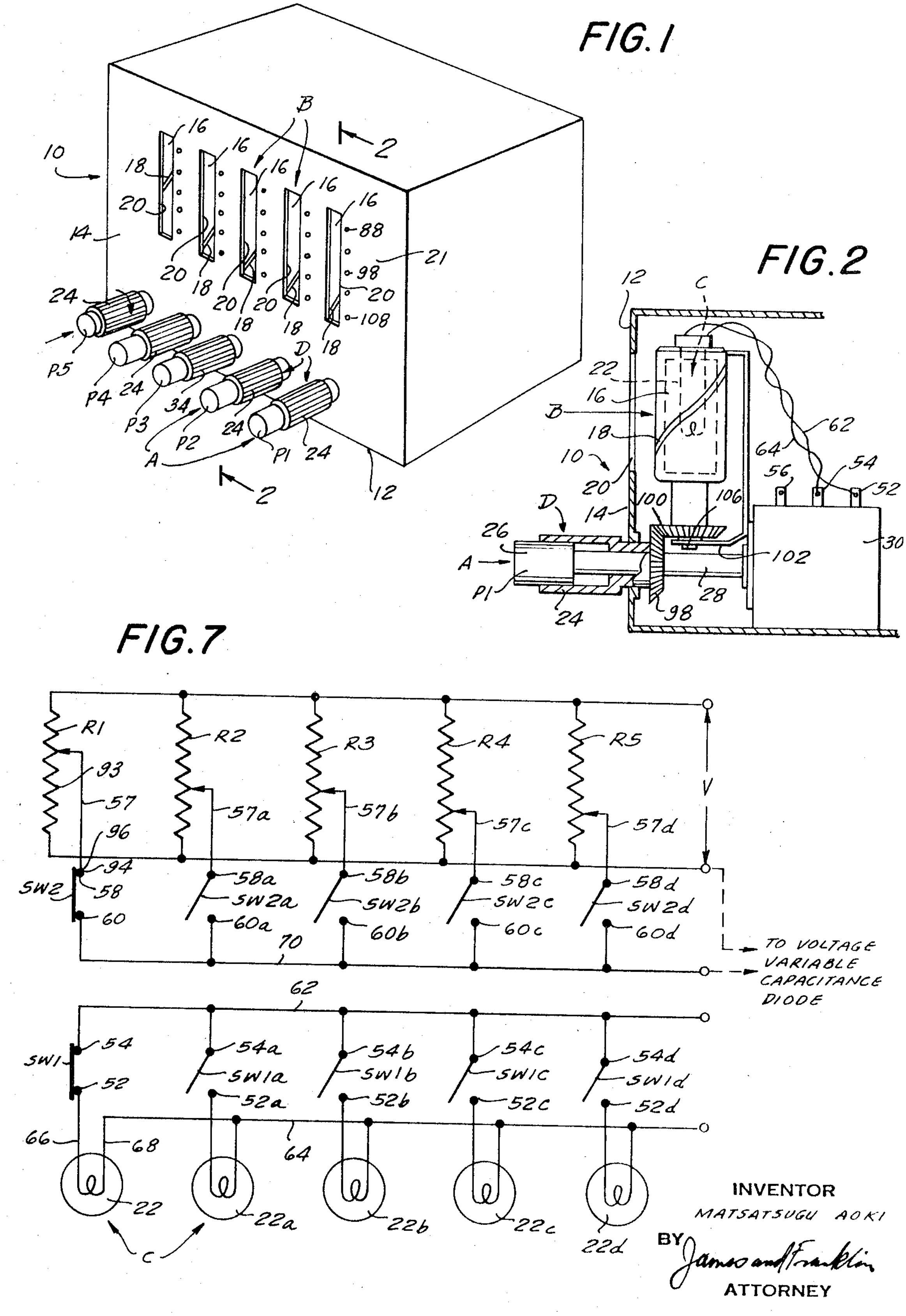
FIG. 1 is a perspective view of a tuner section of a communications receiver illustrating features of the present invention.
FIG. 2 is a simplified vertical cross section taken along the line 2–2 of FIG. 1.
FIG. 7 is a schematic diagram of the switching circuits of the tuner of FIG. 1.

A tuner 10 embodying features of this invention as shown in FIG. 1 has its components contained in a housing 12 having a front panel 14. A plurality of station selectors A in the form of pushbuttons generally designated P1—P5 have portions extending both from and into housing 12. These pushbuttons are selectively actuated to operatively connect one of a plurality of tuning elements into a tuning circuit (not shown) of the receiver, thereby to tune the receiver to a predetermined frequency to effect station selection in a known manner.

The tuning element may take one of several forms such as tuning inductance slugs, or a variable capacitor. As herein specifically described, the tuning elements are in the form of a plurality of voltage sources one of which is operatively connected by the actuation of one of the selectors to a voltage-variable capacitance diode, which forms at least a part of the receiver tuning circuit. The voltage sources are in the form of a plurality of potentiometers R1—R5 (FIG. 7) each connected to a common voltage supply V and producing an output voltage level proportional to the relative position of its wiper arm 57.

A plurality of indicators B, each in the form of a translucent, hollow cylinder 16, are located within housing 12 and have indicia means in the form of an opaque contrasting spiral 18 formed about its outer surface (FIG. 2). A segment of spiral 18 is at all times visible through each of the vertical slots or windows 20 formed in front panel 14, one of said slots being respectively located in front of each of the cylinders 16. The relative vertical position of that segment as viewed through slot 20 indicates the frequency to which the tuner will be tuned by the actuation of the pushbutton P located beneath that slot. Appropriate indicia is inscribed on front panel 14, as at 21, to correlate the vertical position of the visible segment of spiral 18 with the selected station (here shown in the FM range).

A lamp 22 defining the illuminating means C is arranged within the hollow interior of each cylinder 18 and is selectively energized by the actuation of that pushbutton P located beneath the slot 20 behind which that cylinder 16 and lamp 22 are located. The energization of that lamp serves to intensify the external visibility of the spiral segment 18 associated with it, thus indicating the station selected by the actuation of the pushbutton.

An articulatable control member D in the form of a rotatable control sleeve 24 extends outwardly from housing 12 and is concentrically disposed about each of pushbuttons P1—P5. Means are provided to operatively connect the individual control members to corresponding potentiometers R1—R5 and to the cylinders 16 to simultaneously vary the value of the corresponding potentiometers, thereby to obtain a new frequency to which the tuning circuit is tuned when that potentiometer is operatively connected thereto, and to rotate one of the cylinders, thereby to vary the relative axial position of the viewable segment of the spiral 18 on that cylinder so as to provide a visual indication of that new frequency.

Figures 3, 5:
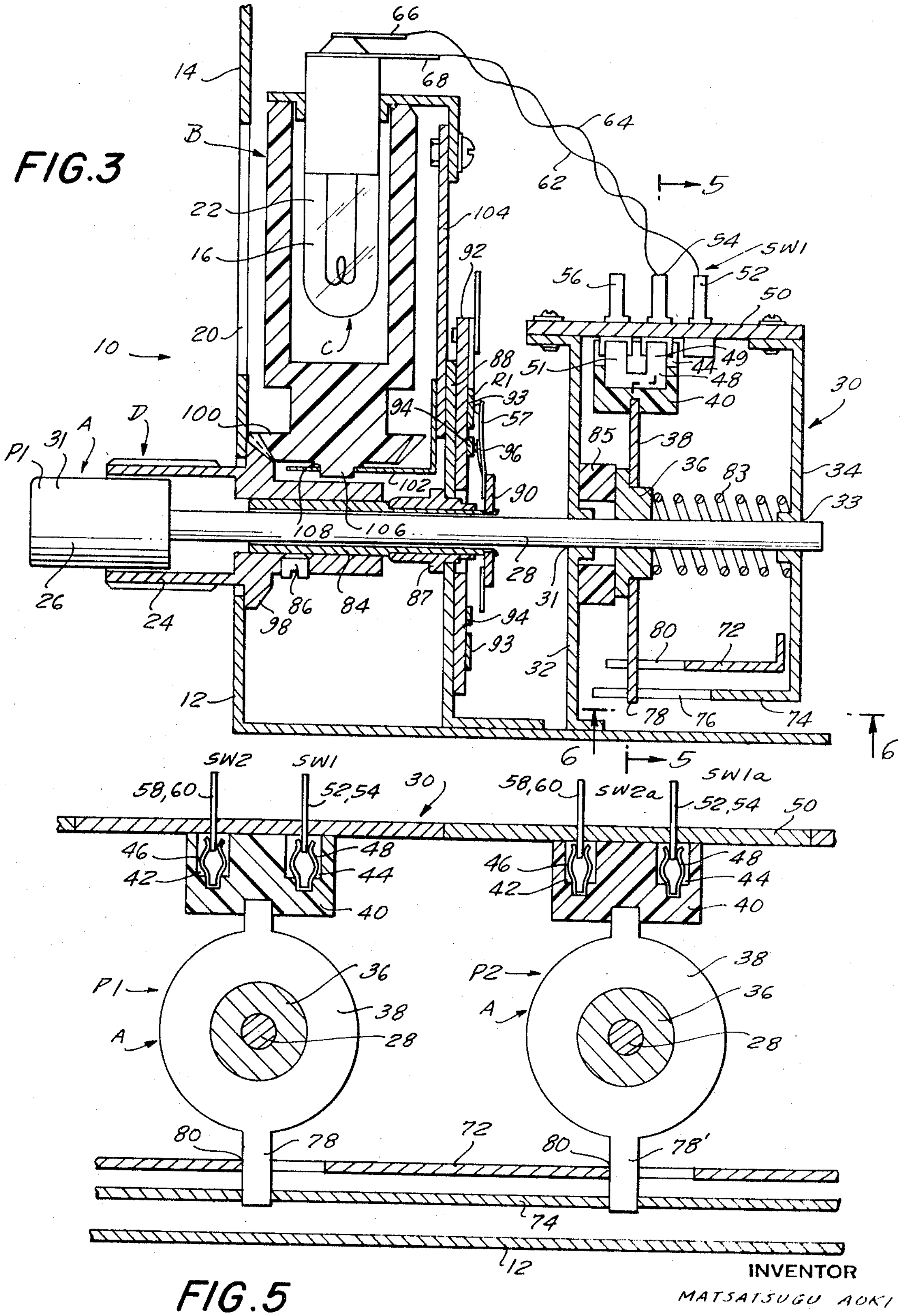
FIG. 3 is a vertical cross-sectional view similar to that of FIG. 2, illustrating in greater detail the components of FIG. 2, and showing the pushbutton in the unactuated position.
FIG. 5 is a cross-sectional view taken along the line 5–5 of FIG. 3.
Figure 4:
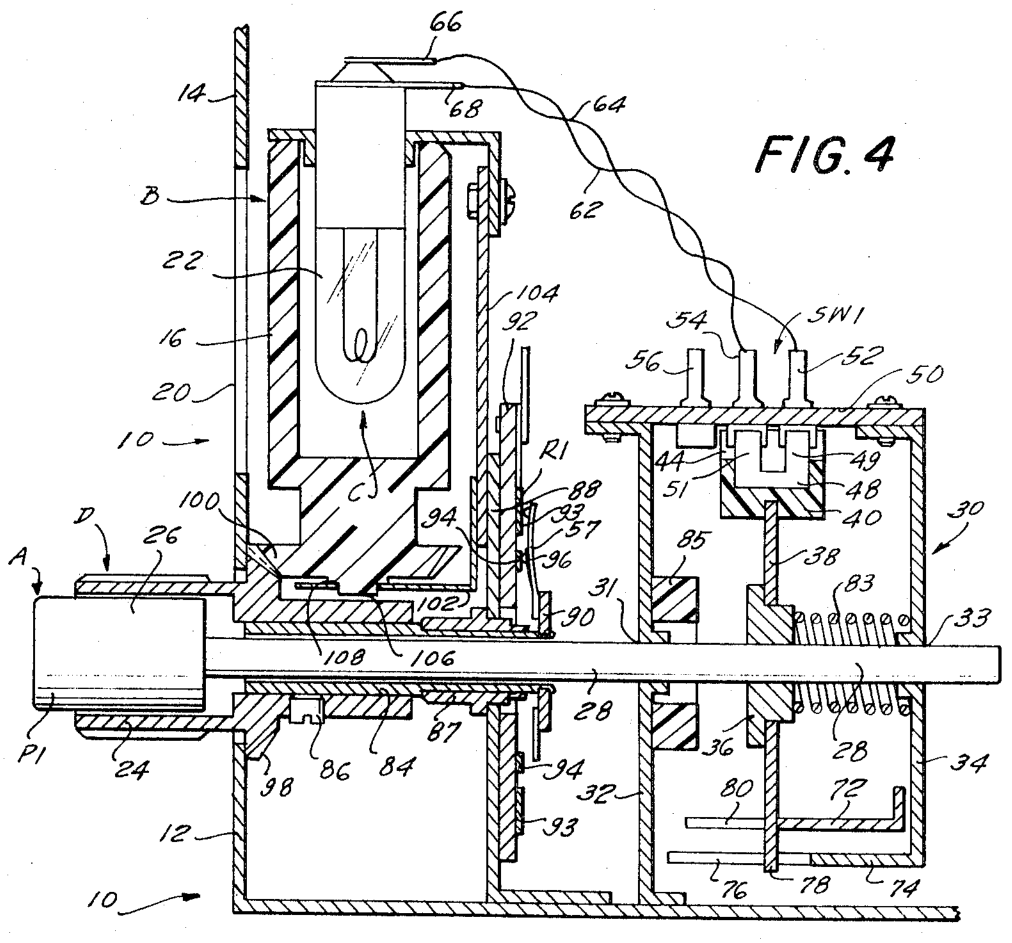
FIG. 4 is a cross-sectional view similar to FIG. 3, showing the pushbutton after it has been moved to the actuated position.

Each of the pushbuttons P1—P5 comprises an enlarged operating member 26 disposed externally of the housing 12 and extending beyond and partly into sleeve 24. In FIGS. 3 and 4 only one pushbutton, i.e. P1 and its associated elements, is shown, it being understood that similar elements are provided for each of the other pushbuttons, i.e. P2—P5. An elongated rod 28 extends from the inner face of member 26 and extends through housing 12 into the interior of a switching unit 30. Rod 28 passes through axially aligned openings 31 and 33 respectively provided in a front panel 32 and a rear panel 34 of switching unit 30. Within the interior of unit 30, rod 28 has secured thereto an insulating disc 36 which carries a circular slider 38 which in turn supports an insulated wafer 40 in which a pair of spaced cutouts 42 and 44 are formed (FIG. 5). A pair of movable switch contacts 46 and 48 are respectively carried within cutouts 42 and 44 and are maintained therein in a secure manner. As seen in FIG. 5, switch contacts 46 and 48 are U-shaped elements having a base inserted into the material of wafer 40 and having its two arms 49 and 51 projecting upwards into cutouts 42 and 44. An upper wall 50 of switching unit 30 carries a pair of switch contacts 52 and 54 and a "dummy" switch contact 56. A similar group of three switch contacts including switch contacts 58 and 60 is provided on wall 50 to the rear of contacts 52—56 as viewed in FIG. 3. Contacts 52 and 54 are the active contacts of a switch SW1 (FIG. 7) and contacts 58 and 60 are the operative switch contacts of a switch SW2. A pair of wires 62 and 64 are respectively connected to switch contacts 52 and 54 of switch SW1 and to the terminals 66 and 68 of lamp 22. Similarly, switch contacts 58 and 60 of switch SW2 are respectively connected to the wiper arm 57 of potentiometer R1 and to a line 70 which is connected to a voltage-variable capacitance diode located in the tuner section of the receiver.

In the unactuated position of pushbutton P1 shown in FIG. 3, the arms 49 and 51 of movable contact 48 carried on wafer 40 engage contact 54 of switch SW1 and dummy contact 56, no contact thus being made between switch contacts 52 and 54. Electrical energy will therefore not be supplied through the contacts of switch SW1, and lamp 22 will not be energized and illuminated. Similarly, there is no electrical connection between the arms of contact 46 and the switch contact 58 and 60 of switch SW2, so that the wiper arm 57 of potentiometer R1 will not be connected to line 70, and the voltage source represented by that potentiometer will not be in operative connection with the tuning element in the tuner for purposes of frequency selection.

Pushbutton P1 is actuated by sliding that button inwardly into the receiver 12 to the position shown in FIG. 4 where it is seen that movable contact 48 has moved towards the right along with rod 28, so that its arms 49 and 51 respectively come into electrical engagement with switch contacts 52 and 54 to effectively close switch SW1 and to connect the electrical energy source to lamp 22, causing the lamp to light. In a similar manner, the inward movement of movable switch contact 46 causes the arms of that switch contact to engage contacts 56 and 58 of switch SW2 to connect the wiper arm 57 of potentiometer R1 to line 70 and thus to the tuning circuit as desired. Thus, the actuation of pushbutton P1 is effective to substantially simultaneously operatively connect the selected potentiometer, e.g. R1, into the tuning circuit to tune that circuit to a determined frequency, and to illuminate the lamp 22 associated with the indicator B of that selected frequency located above the actuated pushbutton, that energized lamp in turn being effective to intensify and thereby increase the visibility of that indicator.

In a similar manner, the other pushbuttons P2—P5 are respectively effective when actuated to respectively connect the contacts *52l—d* and *54a—d* of switches **SW1*a*—SW1*d* to in turn respectively energize one of lamps *22a—22d*; and to respectively connect the contacts *58a—58d* and *60a—60d* of switches SW2*a*—SW2*d*, so as to operatively connect the wiper arms *57a—57d* of potentiometers B2—R5 respectively to line 70** and thus to the tuning diode in the receiver tuning circuit.

Figure 6:
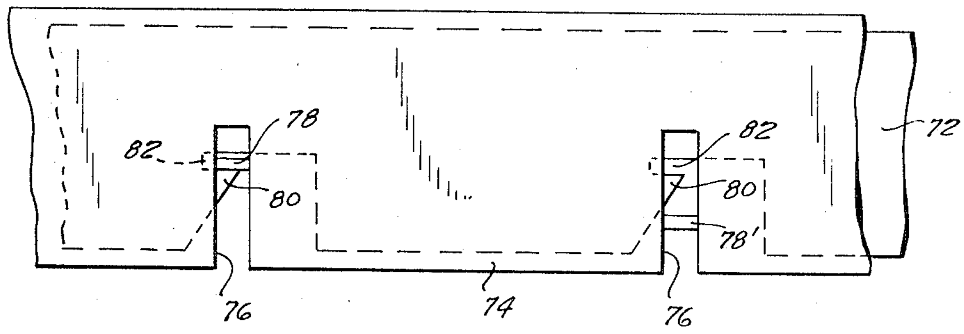
FIG. 6 is a bottom plan view as viewed along the line 6–6 of FIG. 3.

To insure reliable and unique station selection for each pushbutton actuation, it is essential that only one of the pushbuttons be actuated at a given time and that the actuation of a pushbutton effect the deactuation of the previously actuated pushbutton. To this end, and as is known, a transversely extending cam plate 72 (FIGS. 5 and 6) and a transversely extending panel 74 spaced below and extending parallel to cam plate 72 are located in switching unit 30 below rod 28. Panel 74 is provided with a plurality of spaced slots 76 in which a projection 78 of each of the sliders 38 carried by rods 28 are free to travel when the pushbutton with which it is associated is moved between its two operative positions. When the pushbutton is moved to its inner or actuated position, the projection 78 engages a camming part or surface 80 on plate 72 (FIG. 6) causing camming plate 72 to be urged towards the left until projection 78 passes over part 80 and enters into a transverse slot 82 defined at the termination of cam part 80. Projection 78 and thus the pushbutton and its associated movable switch contacts 52, 54 and 58, 60 are then effectively latched to cam plate 72 in a fixed position. The lateral movement of the cam plate 72 releases the projection 78′ of the previously actuated pushbutton (P2 in FIGS. 5 and 6) A compression spring 83 positioned between end walls 34 and disc 38 is effective to return the previously actuated pushbutton to the unactuated position shown in FIG. 3. To prevent damage to the disc 38, upon its return to its unactuated position, a rubber member 85 is secured to front wall 32 of unit 30 and receives and cushions the disc 36 upon its return movement. In the return movement of the pushbutton to its unactuated position, the previously connected switch contacts of switches SW1 and SW2 associated with that pushbutton are disconnected so that its associated lamp 22 is deenergized and its associated voltage source or potentiometer R is removed from operative connection within the tuning circuit.

To modify one or more of the preselected frequencies, when desired, means are provided to vary the relative position of the wiper arm of each potentiometer, thereby to vary the voltage supplied to the tuning element in the tuning circuit when that potentiometer is inserted into the tuning circuit. Thus, a hollow sleeve 84 is coaxially arranged about the pushbutton rod 28 and is secured to the inner surface of sleeve 24 be means such as setscrew 86. The sleeve 84 and a bushing 87 secured about its end pass through an opening provided in an upstanding plate 88. The sleeve 84 carries at its outer end a member 90 to which the wiper arm 57 of potentiometer R1 is secured. An insulating plate 92 is secured to panel 88 and potentiometer R1, in the form of a circular disc 93 of resistance material, and a contact ring 94 are mounted on plate 92. The resilient wiper arm 57 carries a contact button 96 which travels along contact ring 94 to make constant electrical contact between the wiper arm and switch contact 58 of switch SW2.

Sleeve 24 comprises a coaxial bevel gear portion 98 which engages a meshing bevel gear portion 100 formed at the lower end of indicating cylinder 16, that cylinder being supported for rotatable movement on a bracket 102 secured to a plate 104 which in turn is secured to plate 88. A hub portion 106 of cylinder 16 is seated in an opening 108 formed in bracket 102 and defines an axis of rotation for the cylinder 16.

To retune the receiver, sleeve 24 is manually rotated without affecting the relative axial position of pushbutton P1. The rotation of sleeve 24 causes a rotation of bevel gear 98 which produces corresponding rotation of the bevel gear 100 and thus of the cylinder 16. At the same time, shaft 84 and thus carrier 90 are rotated along with sleeve 84, causing wiper arm 57 to slide along the resistance ring 93 of potentiometer R1, thereby to vary the value of the effective resistance of that potentiometer. As explained above, the variation of the resistance of potentiometer R1 varies the voltage which will be applied to the variable-capacitance tuning element operatively inserted in the tuning circuit by the actuation of its associated pushbutton.

The rotation of the cylinder 16 produces, as viewed through the slot 20 in front panel 14, a variation in the relative vertical position of the visible segment of spiral 18. That vertical position is correlated with the frequency to which the receiver is tuned by means of the station identifying indicia 21. Thus, the variation of the potentiometer to bring about corresponding variation of the tuning element to select a new frequency or station, simultaneously causes a variation of the visible indication of that frequency at the front panel 14 of the receiver. It is significant that each tuning element can be tuned to a desired frequency even when it is not operative, and even if the receiving set is not energized. When a given potentiometer R is inserted into the tuning circuit for purposes of frequency selection by actuation of a given pushbutton P, the lamp 22 located within the indicating cylinder 16 associated with that potentiometer will be energized to provide an indication of the selected station and an intensified and more clearly visible indication of the frequency thereof.

The tuning indicator of the present invention thus provides pushbutton-controlled station selection of one of a plurality of preselected stations, and visual indication of the selected station corresponding to that one of the pushbuttons which is actuated. This is achieved by providing a pair of switch contacts respectively operatively connected to the tuning element and to an illuminating source which are simultaneously actuated upon the actuation of one of the pushbuttons. Variation of one or more of the selected frequencies is effected by control means associated with each pushbutton and effective to simultaneously vary the value of the tuning element to bring about that frequency variation as well as the position of the indicator associated with that pushbutton selector. This can be done whether or not the particular pushbutton is actuated, and whether the receiving set is on or off. The tuning indicator is in the form of a cylinder having a contrasting spiral formed along its outer surface, the cylinder being rotatable along with the articulation of the control means. The visibility of that indicating spiral is intensified by the selective energization of the lamp source located within that cylinder upon the actuation of the pushbutton with which it is associated. The tuning indicator is thus reliable in operation and provides a clear and unambiguous indication of which of a plurality of pushbuttons is actuated at a given time and also provides a clear and accurate indication of the frequency which is selected by the actuation of that pushbutton. The tuning indicator employs components which are sturdy, inexpensive and reliable in use and thus provides reliable tuning and tuning indication for a long period of receiver use.

While only a single embodiment of this invention has been herein specifically disclosed, it will be apparent that variations may be made thereto without departing from the spirit and scope of the invention as defined in the following claims:

I claim:

1. In a communication receiver having a tuning circuit, tuning means adapted to be connected in operative circuit arrangement in said tuning circuit, a plurality of individually actuatable selecting means respectively operatively connected to said tuning means, each being effective when actuated to vary said tuning means in a predetermined manner, thereby to tune the receiver to a predetermined frequency, a plurality of discrete indicating means each corresponding to a different one of said selecting means and each having a reference means and an indicating member for providing a visual indication of the predetermined frequency associated with its corresponding selecting means, a plurality of illuminating means respectively located adjacent each of said indicating means and effective when energized to illuminate a corresponding one of said indicating means, and a plurality of first switch means respectively operatively connected to said selecting means and to said illuminating means and effective upon the actuation of one of said selecting means to selectively energize a corresponding one of said illuminating means, thereby to provide a visual indication of which of the selecting means is actuated and thus of the frequency at which the receiver is tuned, a plurality of articulatable control means, each associated with a different one of said selecting means and operatively connected to said indicating means and said tuning means associated therewith and effective to adjust both together whether or not their associated selecting means is actuated.

2. In a communication receiver having a tuning circuit, tuning means adapted to be connected in operative circuit arrangement in said tuning circuit, a plurality of individually actuatable selecting means respectively operatively connected to said tuning means, each being effective when actuated to vary said tuning means in a predetermined manner, thereby to tune the receiver to a predetermined frequency, a plurality of discrete indicating means each corresponding to a different one of said selecting means and each having a reference means and an indicating member for providing a visual indication of the predetermined frequency associated with its corresponding selecting means, a plurality of illuminating means respectively located adjacent each of said indicating means and effective when energized to illuminate a corresponding one of said indicating means, and a plurality of first switch means respectively operatively connected to said selecting means and to said illuminating means and effective upon the actuation of one of said selecting means to selectively energize a corresponding one of said illuminating means, thereby to provide a visual indication of which of the selecting means is actuated and thus of the frequency at which the receiver is tuned, a plurality of articulatable control means, each associated with a different one of said selecting means and operatively connected to said tuning means associated therewith and effective to adjust said tuning means whether or not its associated selecting means is actuated, said tuning circuit comprising a voltage-variable tuning device, said tuning means each comprising a variable voltage source, said first switch means being effective when actuated to operatively connect one of said sources to said tuning device.

3. In the receiver of claim 1, said indicating members each comprising a rotatable cylinder having a body with a contrasting spiral provided along its cylindrical surface, and a frame disposed in front of said cylinders and having a plurality of slots therein extending substantially axially relative to said cylinders, through which slots said spirals are respectively visible.

4. In the receiver of claim 3, said tuning means comprising a plurality of individually adjustable tuning elements, and a plurality of second switch means respectively operatively connected to said selecting means and to said tuning elements and effective, when one of said selecting means is actuated, to operatively connect a corresponding one of said tuning elements to the tuning circuit, whereby actuation of one of said selecting means simultaneously tunes said receiver to a predetermined frequency and illuminates the appropriate indicating means.

5. In the receiver of claim 1, said selecting means comprising a slidable member, said first switch means being operatively connected to said member, said control means comprising a sleeve articulately disposed about said member.

6. In the receiver of claim 1, said indicating members each comprising a rotatable cylinder having a body with a contrasting spiral provided along its cylindrical surface, and a frame disposed in front of said cylinder and having a plurality of slots therein extending substantially axially relative to said cylinders, through which slots said spirals are respectively visible.

7. In the receiver of claim 1, said tuning means comprising a plurality of individually adjustable tuning elements, and a plurality of second switch means respectively operatively connected to said selecting means and to said tuning elements and effective, when one of said selecting means is actuated, to operatively connect a corresponding one of said tuning elements to the tuning circuit, whereby actuation of one of said selecting means simultaneously tunes said receiver to a predetermined frequency and illuminates the appropriate indicating means.

8. In the receiver of claim 7, a plurality of articulatable control means each operatively connected to a different one of said selecting means and to said indicating means associated therewith and effective to adjust both together.

9. In the receiver of claim 8, said selecting means comprising a slidable member, said first switch means being operatively connected to said member, said control means comprising a sleeve articulately disposed about said member.

10. A communication receiver comprising a housing having a front, a plurality of pushbutton actuated rods slidably mounted in said housing exposed at said front for manual pushbutton actuation from a first position to a second position, a plurality of sleeves respectively disposed about each of said rods and exposed at said front for manual adjustment, a plurality of discrete indicator means respectively operatively connected to each of said sleeves for adjustment thereby independently of the position of said rods and adapted when rendered operative to be visible at said front, a single tuning circuit, a plurality of tuning means adapted to be selectively connected in operative circuit arrangement in said tuning circuit, said tuning means being respectively operatively connected to each of said sleeves for adjustment thereby independently of the position of said rods, and a plurality of switch means respectively operatively connected to each of said rods for actuation thereby upon movement of said rods from said first to said second position and to corresponding ones of said indicator means and said tuning means and effective when actuated by said rods to render said corresponding indicator means operative, and to connect said corresponding tuning means in operative circuit arrangement in said tuning circuit.

11. The receiver of claim 10, in which said means for rendering said indicator means operative comprises a plurality of illuminating means respectively operatively connected to each of said switch means and effective to be energized when its associated switch means is actuated.

12. The receiver of claim 11, in which said tuning circuit comprises a voltage-variable tuning device, said tuning means each comprising a variable voltage source, said switch means being effective when actuated to operatively connect one of said sources to said tuning device.

13. The receiver of claim 12, in which each said indicator means comprises a rotatable cylinder having a body with axially and circumferentially offset indicia means thereon, said housing front having a plurality of slots therein each registering with and extending in substantially axial relation to one of said cylinders, each indicia means being visible through one of said slots.

14. The receiver of claim 10, in which said tuning circuit comprises a voltage-variable tuning device, said tuning means each comprising a variable voltage source, said switch means being effective when actuated to operatively connect one of said sources to said tuning device.

15. The receiver of claim 14, in which each said indicator means comprises a rotatable cylinder having a body with axially and circumferentially offset indicia means thereon, said housing front having a plurality of slots therein each registering with and extending in substantially axial relation to one of said cylinders, each indicia means being visible through one of said slots.

16. The receiver of claim 10, in which each said indicator means comprises a rotatable cylinder having a body with axially and circumferentially offset indicia means thereon, said housing front having a plurality of slots therein each registering with and extending in substantially axial relation to one of said cylinders, each indicia means being visible through one of said slots.

17. The receiver of claim 11, in which each said indicator means comprises a rotatable cylinder having a body with axially and circumferentially offset indicia means thereon, said housing front having a plurality of slots therein each registering with and extending in substantially axial relation to one of said cylinders, each indicia means being visible through one of said slots.

18. The receiver of claim 1, in which said tuning circuit comprises a voltage-variable tuning device, said tuning means each comprising a variable voltage source, said first switch means being effective when actuated to operatively connect one of said sources to said tuning device.

19. The receiver of claim 7, in which said tuning circuit comprises a voltage-variable tuning device, said tuning elements each comprising a variable voltage source, said first switch means being effective when actuated to operatively connect one of said sources to said tuning device.

20. The receiver of claim 10, in which said tuning circuit comprises a voltage-variable tuning device, said tuning means each comprising a variable voltage source, said switch means being effective when actuated to operatively connect one of said sources to said tuning device.